United States Patent
Sibilli et al.

(10) Patent No.: US 10,550,722 B2
(45) Date of Patent: Feb. 4, 2020

(54) HEAT EXCHANGE SYSTEM FOR POWER GEAR BOX, A POWER GEAR BOX AND A TURBO ENGINE WITH A POWER GEAR BOX

(71) Applicant: Rolls-Royce Deutschland Ltd & Co KG, Blankenfelde-Mahlow (DE)

(72) Inventors: Thierry Sibilli, Busan (KR); Bjorn Ulrichsohn, Dresden (DE); Jonas Schwengler, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 471 days.

(21) Appl. No.: 15/378,863

(22) Filed: Dec. 14, 2016

(65) Prior Publication Data

US 2017/0175579 A1 Jun. 22, 2017

(30) Foreign Application Priority Data

Dec. 17, 2015 (EP) ..................................... 15200736

(51) Int. Cl.
*F02C 7/14* (2006.01)
*F01D 25/12* (2006.01)
(Continued)

(52) U.S. Cl.
CPC ............. *F01D 25/12* (2013.01); *F01D 25/02* (2013.01); *F01D 25/18* (2013.01); *F02C 3/107* (2013.01);
(Continued)

(58) Field of Classification Search
CPC ...... F02C 7/12; F02C 7/14; F02C 7/36; F02C 3/107; F01D 25/12; F16H 57/0417; F28F 13/003
See application file for complete search history.

(56) References Cited

U.S. PATENT DOCUMENTS 3,797,561 A * 3/1974 Clark ...................... F01D 25/18
165/51
4,782,658 A * 11/1988 Perry ...................... F02C 7/047
60/226.1
(Continued)

FOREIGN PATENT DOCUMENTS

EP 1884625 A2 2/2008
EP 2719927 A1 4/2014
(Continued)

OTHER PUBLICATIONS

European Search Report dated Jun. 27, 2016 from counterpart European App No. 15200736.
(Continued)

*Primary Examiner* — Steven M Sutherland
(74) *Attorney, Agent, or Firm* — Shuttleworth & Ingersoll, PLC; Timothy Klima

(57) ABSTRACT

A heat exchange system for a power gear box mechanically coupling at least one low pressure compressor stage with at least one turbine stage in a turbo engine, in particular an aircraft turbo engine, is provided. At least one heat transfer device is enclosed, embedded and/or attached with the casing of the power gear box and the casing and/or the heat transfer device comprise at least one heat transfer and/or fluid flow guiding structure, in particular a ribbed surface, a finned surface and/or a studded surface, wherein at least one airflow is directed to the at least one heat transfer device for thermally controlling the power gear box.

20 Claims, 14 Drawing Sheets

(51) Int. Cl.

| | | |
|---|---|---|
| *F16H 57/04* | (2010.01) | |
| *F28F 13/00* | (2006.01) | |
| *F01D 25/18* | (2006.01) | |
| *F02C 3/107* | (2006.01) | |
| *F02C 7/12* | (2006.01) | |
| *F01D 25/02* | (2006.01) | |
| *F02C 7/36* | (2006.01) | |

(52) U.S. Cl.
CPC .............. *F02C 7/12* (2013.01); *F02C 7/14* (2013.01); *F02C 7/36* (2013.01); *F16H 57/0415* (2013.01); *F16H 57/0417* (2013.01); *F28F 13/003* (2013.01); *F05D 2220/323* (2013.01); *F05D 2260/201* (2013.01); *F05D 2260/2214* (2013.01)

(56) References Cited

U.S. PATENT DOCUMENTS

| | | | |
|---|---|---|---|
| 4,887,424 A | 12/1989 | Geidel et al. | |
| 4,914,904 A | 4/1990 | Parnes et al. | |
| 2010/0218921 A1 | 9/2010 | Sabatino et al. | |
| 2014/0106922 A1* | 4/2014 | Hancox | F01D 25/18 475/159 |
| 2014/0246170 A1 | 9/2014 | Snyder et al. | |
| 2015/0132101 A1 | 5/2015 | Marsh et al. | |
| 2015/0285186 A1* | 10/2015 | Roberge | F02C 7/06 60/772 |

FOREIGN PATENT DOCUMENTS

| | | |
|---|---|---|
| WO | WO2008045054 A1 | 4/2008 |
| WO | WO2014123857 A1 | 8/2014 |
| WO | WO2014134040 A1 | 9/2014 |
| WO | WO2015108674 A1 | 7/2015 |

OTHER PUBLICATIONS

European Search Report dated Jun. 20, 2016 from related European App No. 15200733.

* cited by examiner

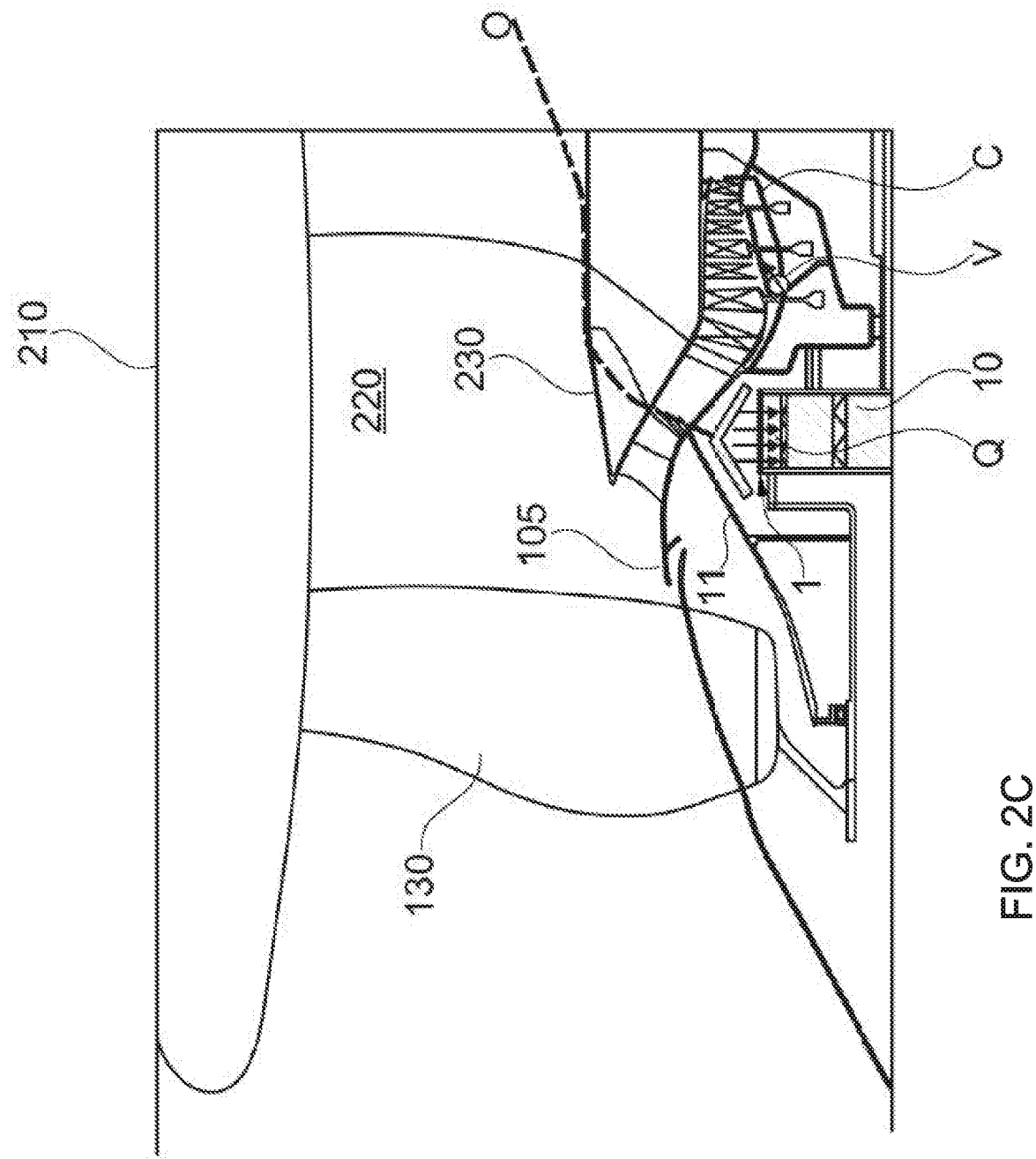

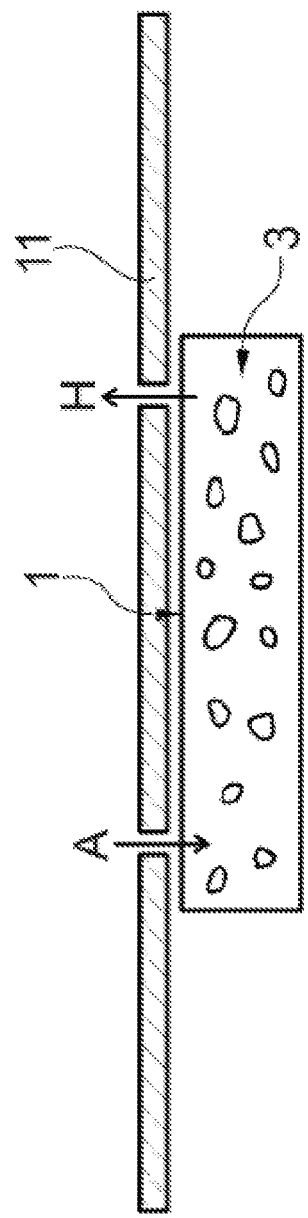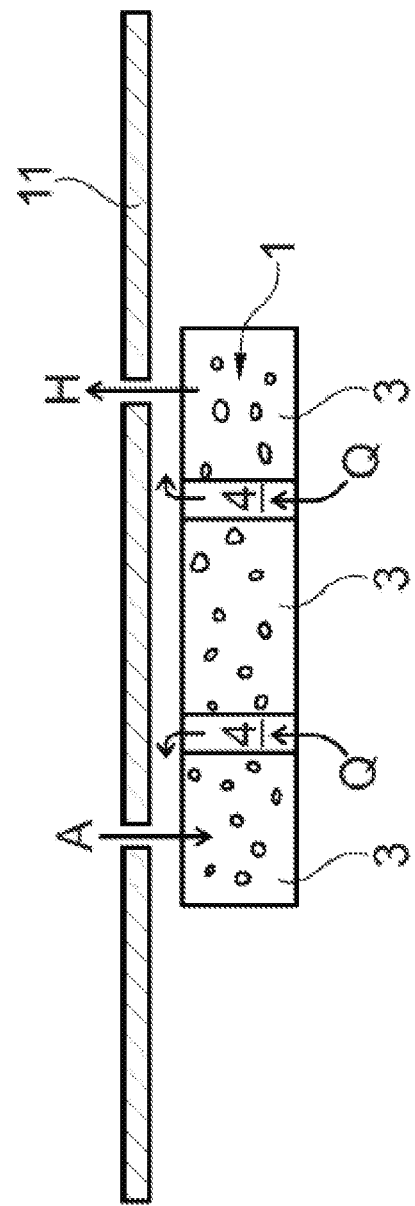

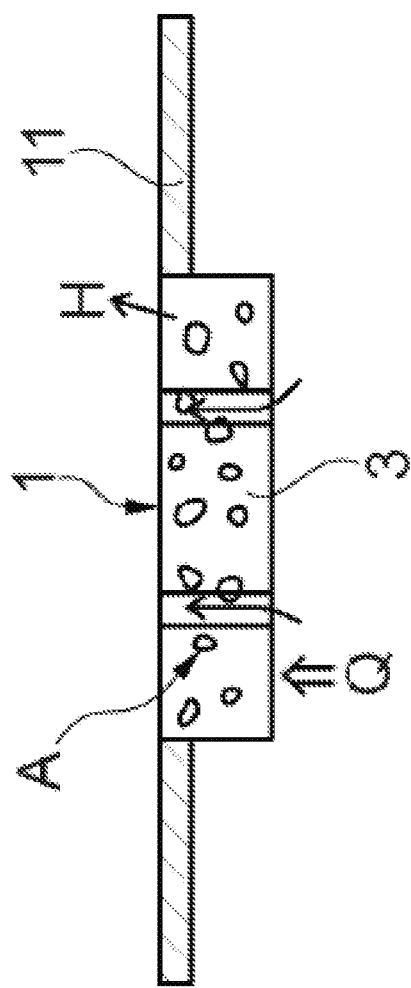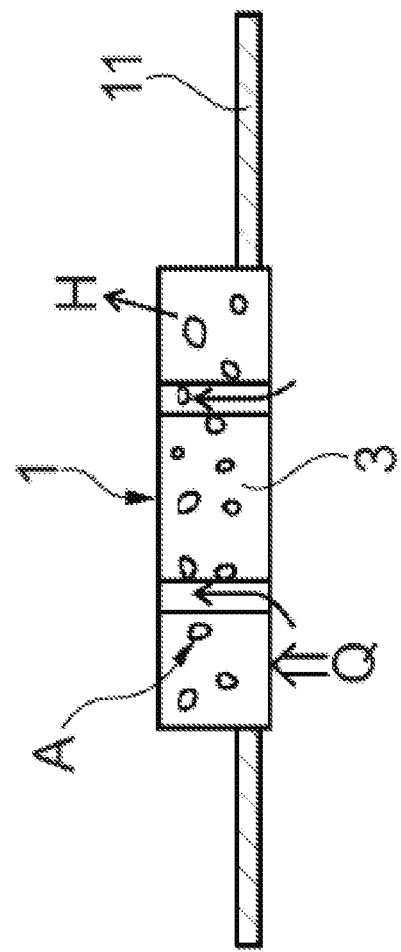

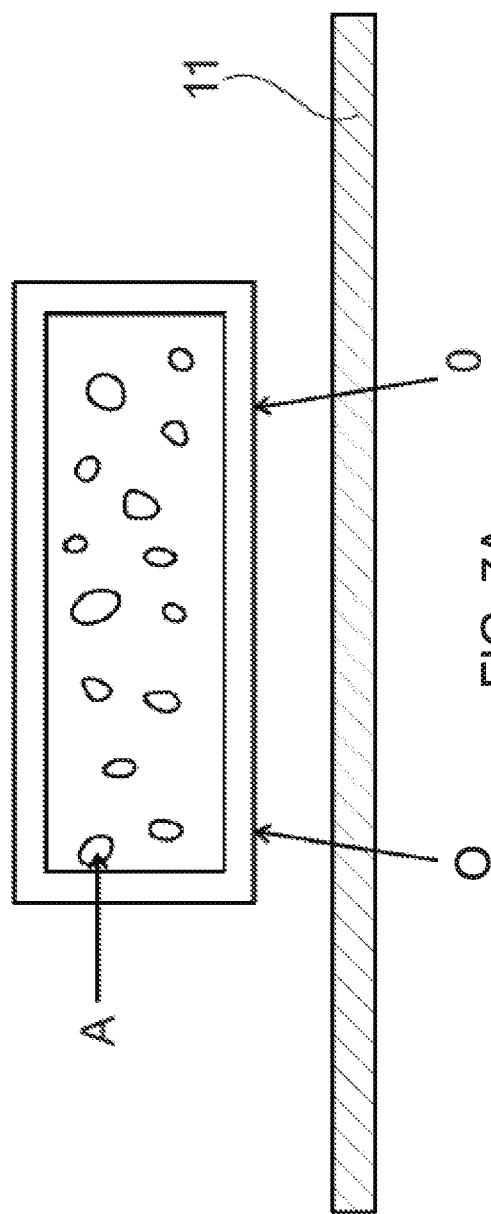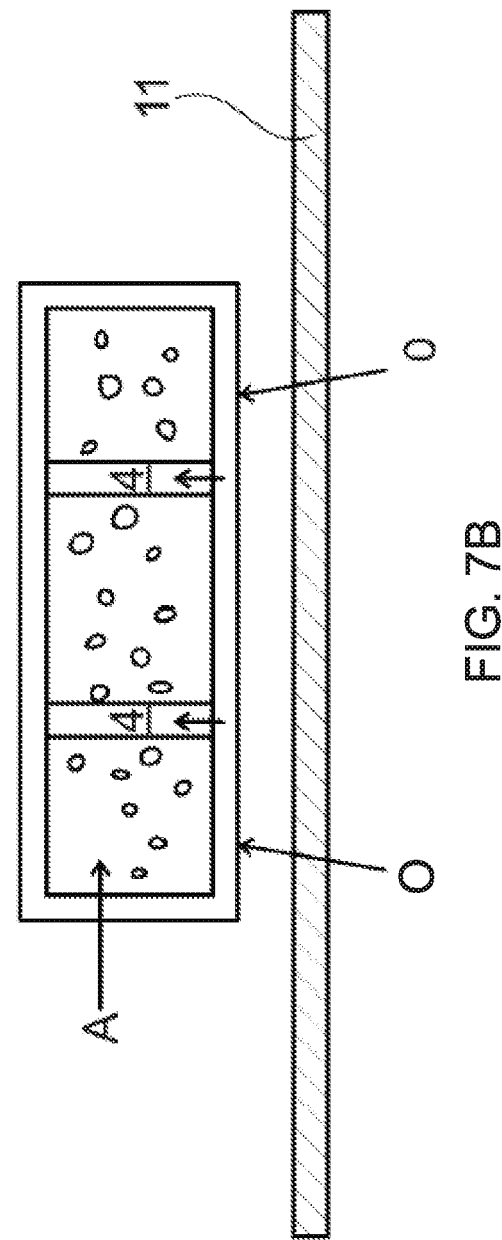

HEAT EXCHANGE SYSTEM FOR POWER GEAR BOX, A POWER GEAR BOX AND A TURBO ENGINE WITH A POWER GEAR BOX

REFERENCE TO RELATED APPLICATION

This application claims priority to European Patent Application No. 15 200 736.5 filed on Dec. 17, 2015, the entirety of which is incorporated by reference herein.

BACKGROUND

The invention relates to a heat exchange system for a power gear box, a power gear box and a turbo engine with a power gear box.

Gear boxes in turbo engines are generally used to mechanically couple rotating parts to change the speed, torque and/or direction of a power source.

SUMMARY

One issue is the thermal management of power gear boxes.

This is addressed by a heat exchange system with the features as described herein.

A power gear box is mechanically coupling at least one low pressure compressor stage with at least one turbine stage in a turbo engine, in particular an aircraft turbo engine. The heat exchange system comprises at least one heat transfer device which is enclosed, embedded and/or attached with the casing of the power gear box.

By using an enclosed, embedded and/or attached heat transfer device the space requirements for the power gear box are reduced. Depending on the heat load on the power gear box, no external heat exchanger or an external heat exchanger with reduced size is required. The use of a power gear box connecting at least one turbine stage with at least one low pressure compressor stage results in a reduction of space requirements for the heat exchangers in the bypass-duct of the aircraft turbo engine. The heat transfer is further enhanced by at least one heat transfer and/or flow guiding structure, in particular a ribbed surface, a finned surface and/or a studded surface which are part of the casing, coupled to the casing and/or the heat transfer device. At least one airflow is directed to the at least one heat transfer device for thermally controlling the power gear box. Enclosed, embedded and attached heat exchanger devices can be used in combinations and sub-combinations.

In one embodiment, the at least one heat transfer device is thermally linking the oil filled power gear box with the outside of the power gear box. For example, oil drops which are centrifugally accelerated within the power gear box can impinge and/or can be directed on or to a hot side of the heat transfer device which is enclosed, embedded and/or attached with the casing.

The at least one airflow can e.g. be taken from a region downstream from a fan (e.g. through a scoop in the bypass duct) of the aircraft engine and/or from a cone of the fan of the aircraft engine to cool the power gear box.

In a further embodiment, a cold side of the at least one heat transfer device is connected to at least one airflow downstream from a fan of the aircraft engine and upstream of an annulus of a core of the aircraft engine.

In an additional embodiment, at least one airflow is taken from compressor bleed air to heat up the power gear box, in particular in a cold start condition. Therefore, the at least one heat transfer device cannot only be used for cooling of the power gear box but also for heating the power gear box. The operation of the heat exchange system (i.e. cooling or heating mode) depends on the operational requirements of the power gear box.

In a further embodiment the heat transfer device is located in axial direction of the aircraft engine partially or completely between the tip of the cone of the aircraft engine and the power gear box.

It is also possible that the at least one heat transfer device is positioned at least partially on the circumference of the power gear box and/or casing, in particular positioned completely around the circumference of the power gear box and/or casing. This can imply that the heat transfer device is embedded in the casing or it is located within the casing. The size and/or location of the heat transfer device can be adjusted to the thermal management requirements of the power gear box and/or to accommodate other components like oil feed pipes. If there is e.g. a particular hot spot in the power gear box, the heat transfer device can be designed for the thermal management of that particular hot spot.

If a cooling airflow is heated by the heat transfer device a heated airflow can be used for anti-icing purposes in the turbo engine, e.g. in a vane of the aircraft engine.

To enhance the heat transfer the heat transfer area can be enlarged by a porous medium, e.g. when at least one heat transfer device comprises at least partially a porous medium, the porous medium also being in thermal contact with the power gear box. An airflow can flow through the porous medium for cooling or heating purposes. The porous medium can comprise or consist of metal foam and/or a 3D mesh, in particular a 3D printed mesh. In particular the porous medium comprises at least partially oil channels for enhancing the heat transfer.

For a further improvement of the heat transfer the casing facing the power gear box, i.e. the inner side of the casing and/or heat exchange device, comprises at least partially an impingement area for oil drops originating from the operating power gear box. The impingement area comprises at least partially at least one of the heat transfer and/or fluid flow guiding structures. An additional effect can be achieved in an embodiment, wherein the at least one heat transfer and/or fluid flow guiding structure comprises or is forming a guide element for the impinged oil so that the oil can be guided towards a predetermined location of the casing and/or the heat exchange device. The fluid guide element can e.g. be a rib structure to guide impinged oil from the center plane to the end planes of the casing. The rib structure at the same time can also a heat transfer structure so that the same structural device serves a dual purpose.

To control the airflows at least one valve system can be used to control at least one input airflow, at least one input compressor airflow and/or at least one exit airflow from the at least one heat transfer device.

In a further embodiment the at least one heat transfer device comprises a material with a higher thermal conductivity than the casing of the power gear box, in particular copper, aluminum, nickel, tungsten, molybdenum and/or an alloy comprising at least two of those metals. Therefore, the heat transfer across the heat transfer device can be enhanced.

Since the power gear box and its casing can have complex shapes, the heat transfer device might have a complex shape as well to be embedded or integrated with the casing. In a further embodiment the at least one heat transfer device is manufactured by a generative process, in particular a laser based deposition process, in particular a laser cladding process. Those processes allow for a great freedom in design.

The issue is also addressed by a power gear box of a turbo engine coupled with at least one heat exchange system as described herein. The power gear box can e.g. mechanically couple a turbine stage as first rotary part with a compressor stage as second rotary part, in particular a fan stage. In such a configuration there is considerable thermal load in the power gear box which requires thermal management.

The issue is also addressed by a turbo engine as described herein, in particular an aircraft turbo engine with at least one power gear box.

BRIEF DESCRIPTION OF THE DRAWINGS

Embodiments of the invention are shown in the figures.

FIG. 2C shows a variation of the first embodiment with a heating flow.

FIGS. 5A-5B show different embodiments of enclosed heat transfer devices.

FIGS. 6A-6D show different embodiments of embedded heat transfer devices.

FIGS. 7A-7B show different embodiments of attached heat transfer devices.

DETAILED DESCRIPTION

Figure 1:
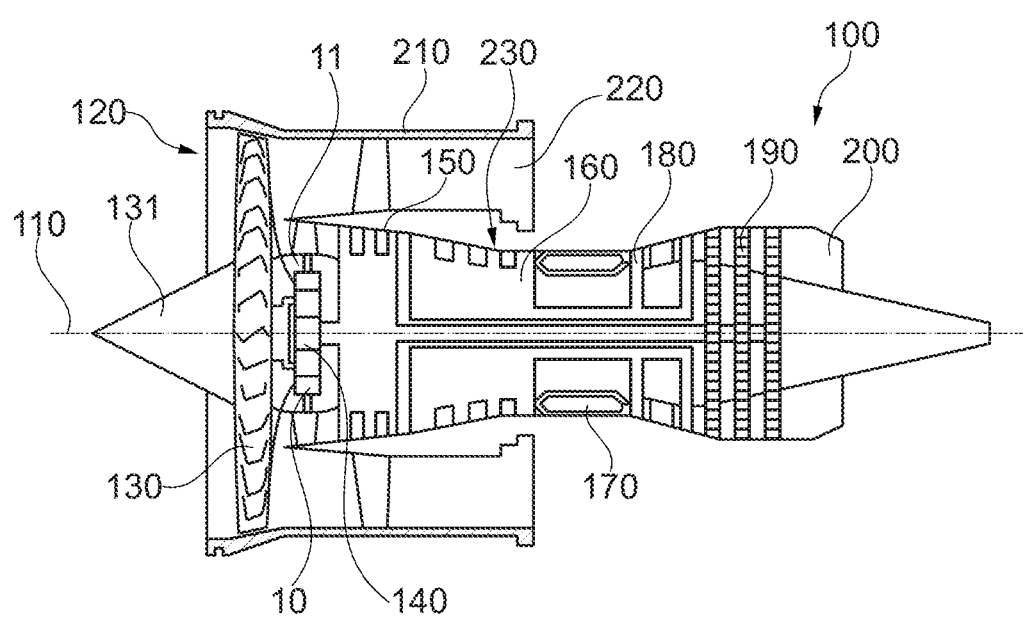
FIG. 1 shows a schematic view of an aircraft turbo engine with a power gear box.

In FIG. 1 an aircraft engine 100 is shown schematically to illustrate the function of one embodiment of a power gear box 10.

FIG. 1 shows a gas turbine engine in the form of a geared turbo fan engine. The engine includes a gas turbine engine 100, having a principal and rotational axis 110. The aircraft engine 100 comprises, in axial flow series, an air intake 120, a propulsive fan stage 130 (which is here considered a part of a low pressure compressor 150), a gear train 140 comprising the power gear box 10, a low pressure compressor 150, a high-pressure compressor 160, a combustor 170, a high-pressure turbine 180, a low-pressure turbine 190 and an exhaust nozzle 200. A nacelle 210 generally surrounds the aircraft engine 100 and defines the air intake 120.

The aircraft engine 100 works in the conventional manner so that air entering the intake 120 is accelerated by the fan 130 to produce two air flows: a first air flow into the low pressure compressor 150 within the core engine 230 and a second air flow which passes through a bypass duct 220 to provide the main propulsive thrust. The low- and high-pressure compressors 150, 160 in the core engine 230 compress the air flow directed into it for combustion in the combustor 170. The air not entering the bypass duct 220 is flowing through the core engine 230.

The resultant hot combustion products expand through, and drive the high and low-pressure turbines 180, 190 before being exhausted through the nozzle 200 to provide additional propulsive thrust. The high pressure turbine 180 and low pressure turbines 190, respectively, drive the high pressure compressor 160 and the low pressure compressor 150/fan 130 via suitable shafting arrangements.

The fan 130 is drivably connected to a low pressure shaft via the gear train 140 located drivable between the low pressure shaft and the fan 130. The gear train 140 is a reduction gear train in that it is arranged to reduce the speed of the fan 130 relative to the speed of the low pressure turbine 190 and low pressure compressor 150. Such an arrangement allows for a higher speed and more efficient low pressure turbine, and a slow spinning larger fan which can provide a higher bypass ratio. This freedom allows the speed of the fan 130 and low pressure turbine 190 to be independently optimized, but at a potential weight penalty resulting from the gear train.

The gear train 140 may be an epicyclic gearbox arranged in a planetary or star configuration. As shown in FIG. 1, the power gear box 10 is connected as a planetary power gear box which provides a favorable gear ratio for large civil gas turbine engines. It will be appreciated that some applications include differential or compound arrangements.

Other aircraft turbine engines 100 to which the present disclosure may be applied may have alternative configurations. By way of example such engines may have an alternative number of interconnecting shafts (e.g. three) and/or an alternative number of compressors and/or turbines.

Figure 2:
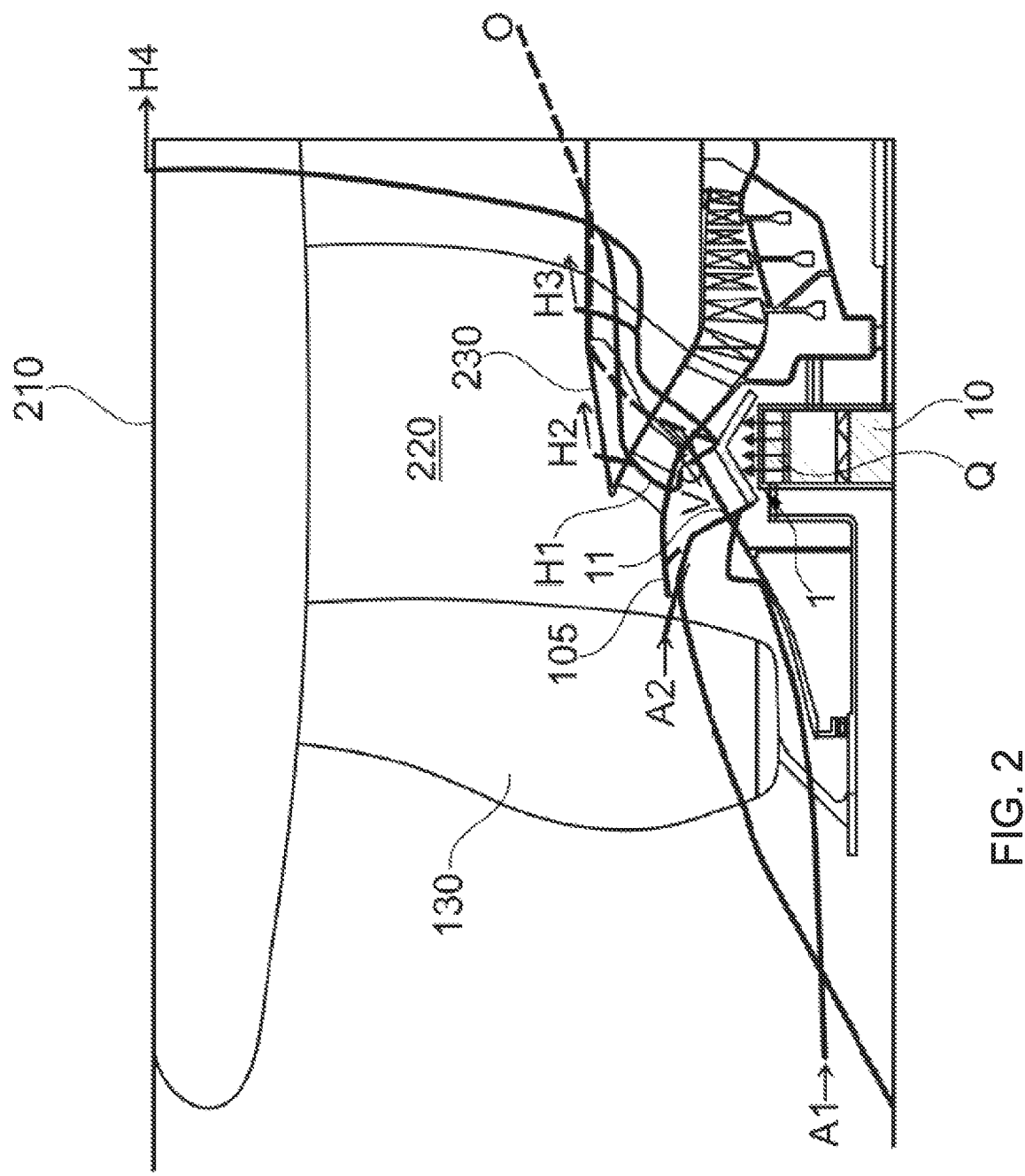
FIG. 2 shows a schematic sectional view of a first embodiment of a heat transfer device enclosed in a power gear box.
Figure 2A:
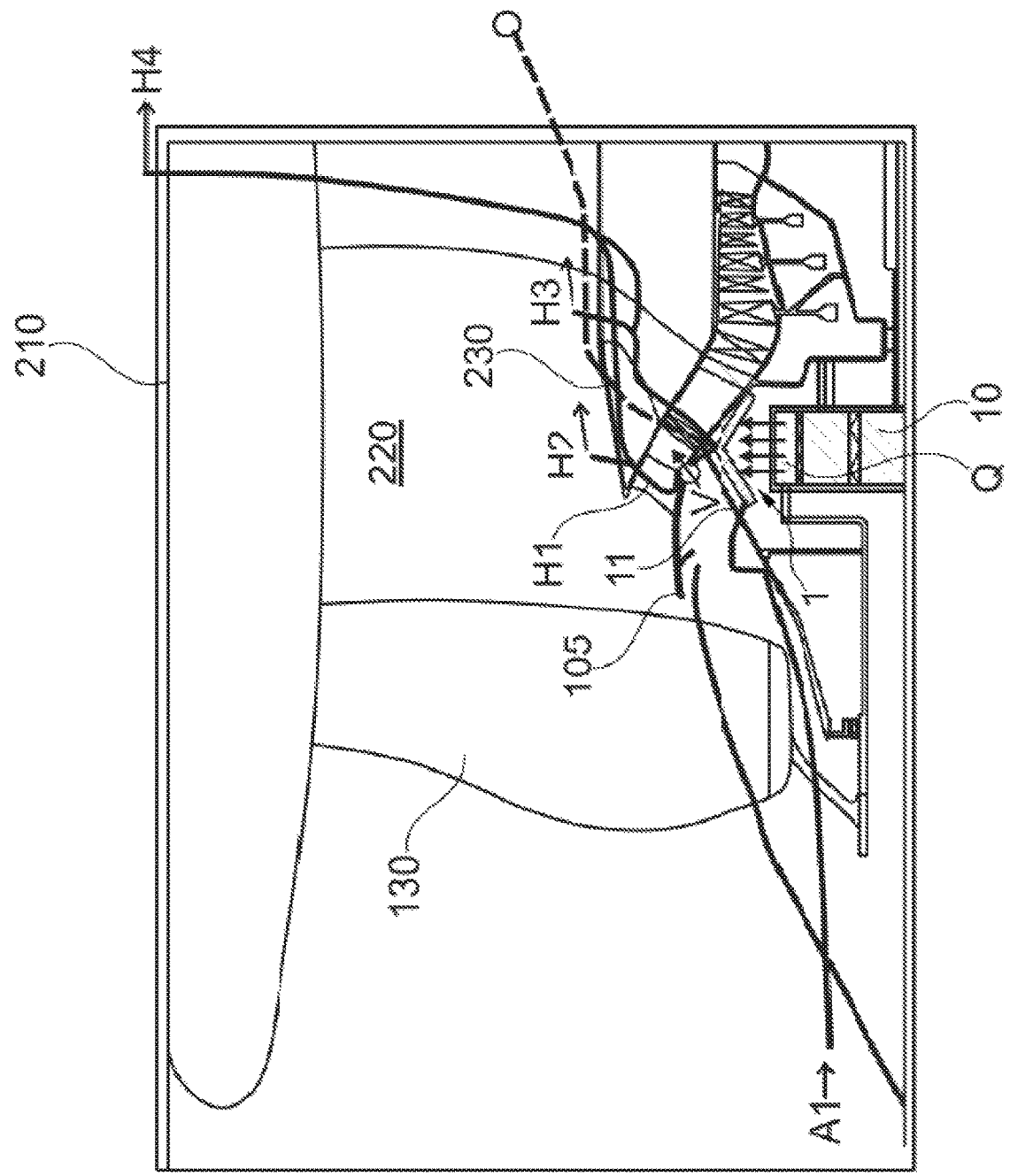
FIG. 2A shows a variation of the first embodiment with one cooling airflow from the cone of the aircraft engine.
Figure 2B:
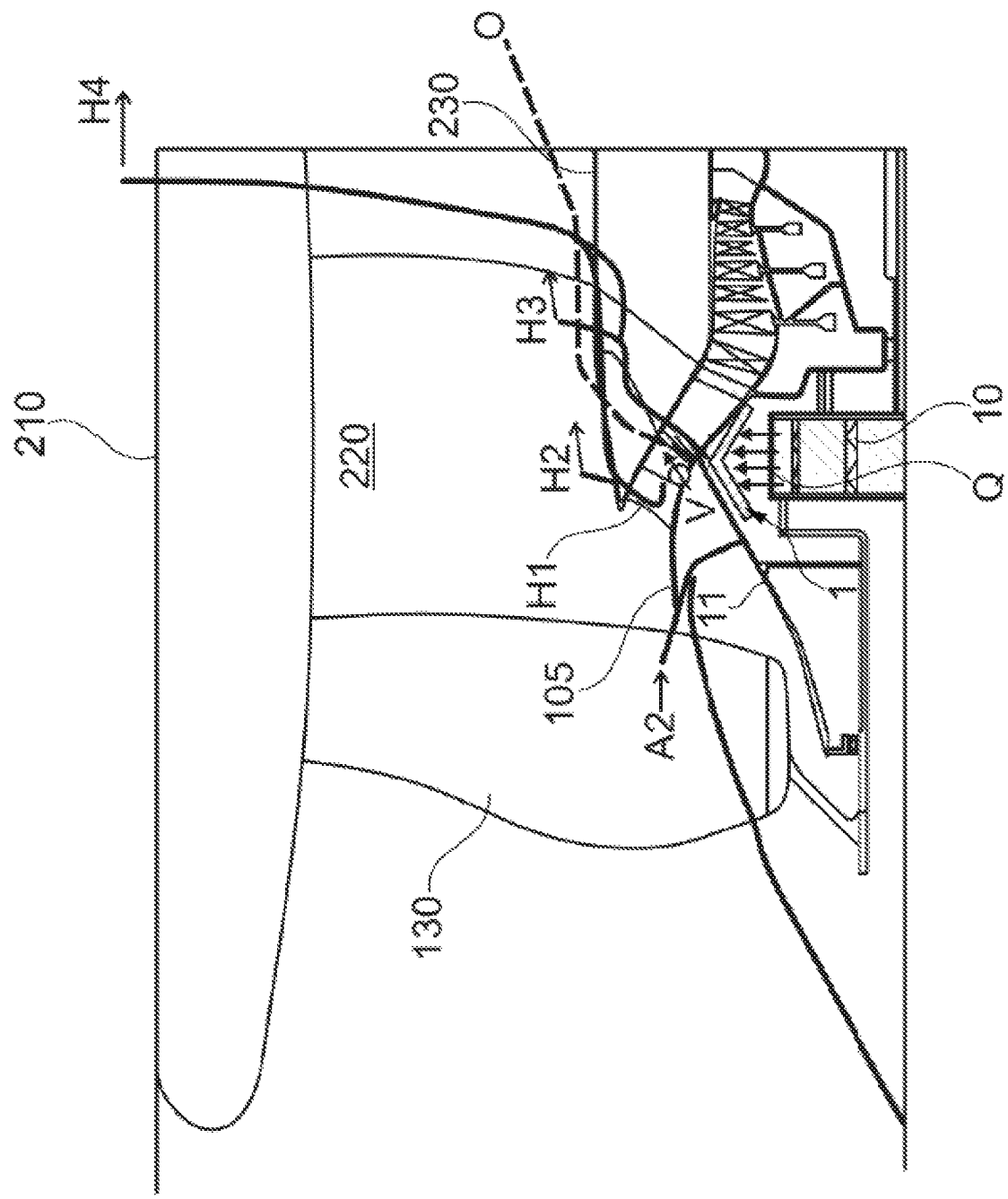
FIG. 2B shows a variation of the first embodiment with one cooling airflow from a region behind a fan of the aircraft engine.
Figure 3:
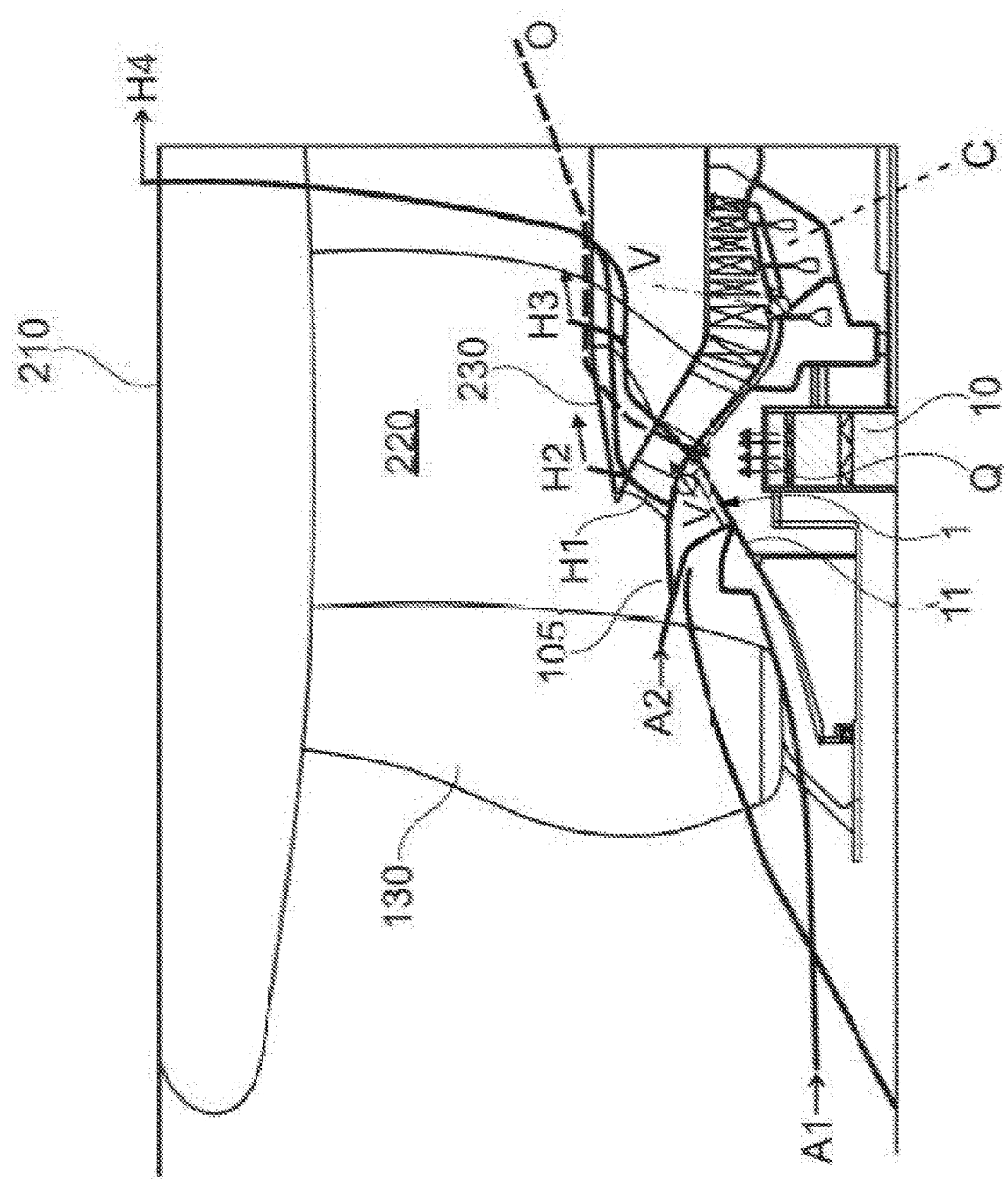
FIG. 3 shows a schematic sectional view of a second embodiment of a heat transfer device embedded in the casing of the power gear box.
Figure 4:
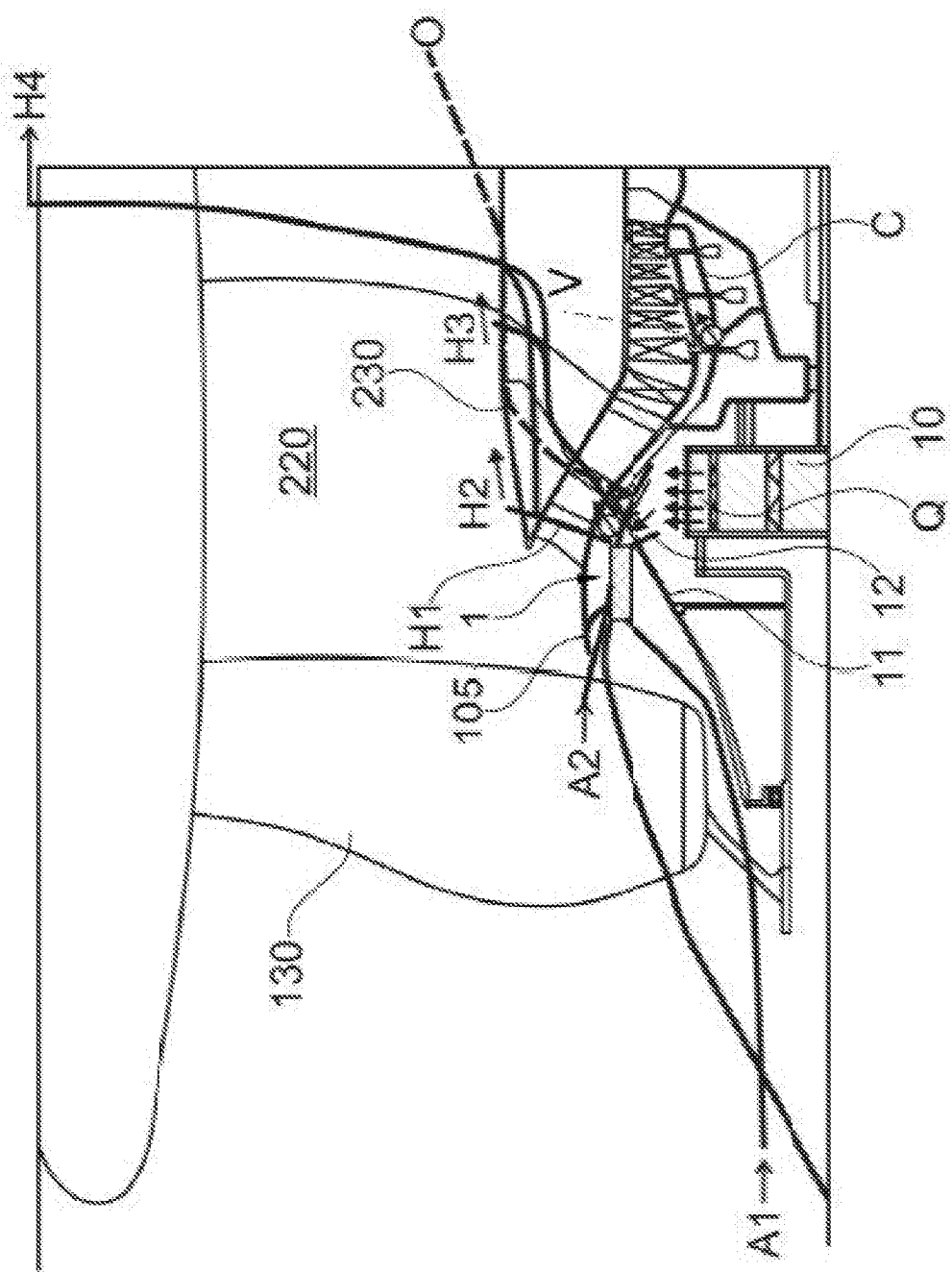
FIG. 4 shows a schematic sectional view of a third embodiment of a heat transfer device attached in the casing of the power gear box.

In FIG. 1 a casing 11 of the power gear box 10 is shown only schematically and shown in more detail in FIGS. 2, 2A, 2B, 2C, 3 and 4. The casing 11 is enclosing the power gear box circumferentially. FIGS. 2, 2A, 2B, 2C, 3, and 4 show different embodiments of how heat generated by the power gear box 10 can be transferred away. In each of FIGS. 2, 2A, 2B, 2C, 3, and 4 a schematic cross-section through the entrance of the core engine 230 is shown. The difference between the different embodiments is that a heat transfer device 1 is enclosed in the casing 11 (FIG. 2), embedded with the casing 11 (FIG. 3) or attached to the casing (FIG. 4).

In the embodiment shown in FIG. 2, a heat transfer device 1 is enclosed within the casing 11. The heat transfer device 1 allows the exchange of heat Q between the power gear box 10 and/or other parts of the aircraft turbine 100. The heat exchange takes place via the hot oil and the heat exchange device.

In this embodiment, the heat transfer device 1 is enclosed within the casing 11 designed for an effective heat transfer through convection, conduction and/or radiation. This means that the heat transfer device 1 is at least partially subjected to oil from the power gear box 10.

The power gear box 10, e.g. a planetary gear drive, adjusts the rotational speed of its output shaft with a sun gear, planet gear and a ring gear, not shown here.

The heat Q generated by the mechanical movements within the power gear box 10 is transferred by oil within the power gear box 10 to the heat transfer device 1, i.e. oil drops impinge on the inner side of the heat transfer device 1.

In the embodiment shown, the heat transfer device 1 covers the complete circumference of the casing 11 but is still enclosed within the casing 11. Here, the heat transfer device 1 is formed by two ring-like structures which are joined at an angle. In cross-section the heat transfer device 1 is V-shaped, the concave side pointing towards the power gear box 10. At the apex of the two ring-like structures of the heat transfer device 1, the gathering oil O is collected and removed from the power gear box 10 (see e.g. FIGS. 8, 9, and 10).

In other embodiments, the heat transfer device 1 only covers a part of the circumference of the casing 11. It is also possible that more than one heat transfer device 1 is used in connection with the casing 11. The casing 11 and/or the heat transfer device 1 also comprise heat transfer and/or fluid flow guiding structures 5 (not shown in FIGS. 2, 3, and 4) which are described in connection with FIGS. 8, 9, and 10.

In the embodiment shown in FIG. 2, the heat transfer device 1 can comprises a material with a higher thermal conductivity than the casing 11 itself, thereby enabling an improved heat transfer from the power gear box 10 into the aircraft engine 100 or vice versa. The materials of the heat transfer device 1 could be e.g. copper, aluminum, nickel, tungsten, molybdenum and/or an alloy comprising at least two of the materials.

Other embodiments—as will be shown below—comprise particular designs in the heat transfer device 1 to enhance the heat transfer.

In the embodiment shown in FIG. 2, airflows A1, A2 are guided from the frontal section of the aircraft turbo engine 100, e.g. the nose cone 131 (airflow A1) and from a location after the fan 130 (airflow A2) via a scoop 105, towards the enclosed heat transfer device 1, entering the heat exchange device 1 which comprises a porous medium in the embodiment shown. The cooling airflows A1, A2 help in cooling the scavenge oil so that apart from the enclosed heat transfer device 1 no external heat exchanger or only a smaller external heat exchanger (not shown here) is required.

Due to the heat exchange the temperature of the airflows A1, A2 is increased so that heated air H1, H2, H3, H4 can e.g. be used of deicing purposes in other parts of the aircraft turbo engine 100, such as a vane 250. FIG. 2 just shows the heating of the air flows A1, A2 and the transport of the heated airflow H in a schematic way. A valve system V is used to control the flow of the heated air H1, H2, H3, H4.

In other embodiments, the cool airflows A1, A2 and the heat airflows H1, H2, H3 might take different routes. The first heat flow H1 is used for deicing the vane 250. The second and third heat flows H2, H3 are directed into the bypass-duct 220. A fourth heat flow H4 is directed overboard outside of the nacelle 210. In other embodiment different combinations and sub-combinations of those hot airflows H1, H2, H3, H4 can be used.

In FIGS. 2A and 2B variations of this embodiment are shown. FIGS. 2A, 2B show essentially the same configuration as shown in FIG. 2, but in FIG. 2A only the airflow A1 from the cone 131 is used. In FIG. 2B only an airflow A2 from a region behind the fan 130 is used.

The heat transfer includes the possibility that the power gear box 10 is heated during one stage of its operation and cooled in another stage of operation. In FIG. 2C the heating is shown schematically as a hot airflow C—controlled by a valve system V—from a compressor stage 150, 160 is used to heat up the power gear box 10 through the heat exchange device 1. This heating mode which is shown here in a separate figure for the sake of simplicity can also be used in conjunction with any of the embodiments shown in FIGS. 2, 2A, and 2B. In FIG. 3 the combination with the heating lines is shown, even though the heating mode is not active, i.e. FIG. 3 shows the cooling mode of the power gear box 10.

The second embodiment shown in FIG. 3 is a heat transfer device 1 in the same context as in FIG. 2 so that the above description is applicable.

Here, the heat transfer device 1 is embedded with the casing 11 of the power gear box 10. Furthermore, the heat transfer device 1 in this embodiment comprises a heat exchanger device 1 with a porous medium 3 which will be further described below. The heat exchange device 1 forms a ring-like structure embedded with the casing 11.

As in the first embodiment, airflows A1, A2 are here taken from the cone 131 and/or from the scoop 105 from the bypass duct 220 of the aircraft engine 100. Even though both airflows A1, A2 are shown here, the alternatives shown in FIGS. 2A and 2B are also applicable here.

The airflows A1, A2 are directed into the porous medium 3 (see FIG. 6 for details) in the heat transfer device 1, the airflows A1, A2 consequently being heated by the oil impinging on the inner side of the embedded heat exchange device 1.

The heated air H1, H2, H3, H4 is then channeled to other parts of the aircraft engine 100, here, e.g., the inlet vane 250 which can be deiced by the hot airflow H1. Regarding the possibilities of the heat reference is made to the description of FIG. 2.

In FIG. 4, a variant of the embodiment shown in FIG. 2 or 3 is shown as third embodiment. Reference can be made to the above description. The heat transfer device 1 is here attached to the casing 11 of the power gear box 10. Oil from the power gear box 10 is gathered by an oil collector 12 and channeled towards the heat transfer device 1 which comprises here a porous medium 3 (see FIG. 7 for details). The oil flow into the attached heat transfer device 1 can be enhanced by a pump which is not shown here.

As in FIG. 3, the line for hot compressor air is shown in FIG. 4.

All embodiments of the heat transfer device 1 described herein can be subjected to heating flows C from compressor stages and/or cooling airflows A as the operation of the aircraft turbo engine 100 requires. The embodiments shown in FIGS. 2, 3 and 4 are just exemplary.

In FIGS. 5, 6, and 7 different views of embodiments of heat exchange systems are shown with different configurations of heat exchange device 1 in particular in relation to the casing 11.

FIGS. 5A, 5B show different variants of a heat exchange device 1 which is enclosed within the casing 11. This corresponds to the embodiments shown in FIGS. 2, 2A, 2B and 2C.

FIGS. 6A, 6B, 6C, 6D show different variants of a heat exchange device 1 which is embedded with the casing 11. This corresponds to the embodiments shown in FIG. 3.

FIGS. 7A, 7B show different variants of a heat exchange device 1 which is attached to the casing 11. This corresponds embodiments shown in FIG. 4.

In FIG. 5A a detail of the casing 11 with an enclosed heat transfer device 1 is shown in a sectional view. The heat transfer device 1 comprises a porous medium 3 through which an airflow A is flowing. The airflow A is channeled through the casing 11 into the enclosed heat transfer device 1. The hot side of the heat transfer device 1 is directed towards the inner side of the casing 11 of the power gear box 10, the power gear box 10 itself not being shown in FIG. 5A.

In FIG. 5B the enclosed heat transfer device 1 comprises oil channels 4 so that the hot oil coming from the not shown power gear box 10 can get into contact with a larger surface area of the heat exchange device 1. The cool airflow A is directed into the porous medium 3 within the heat exchange device 1.

Figure 6A:
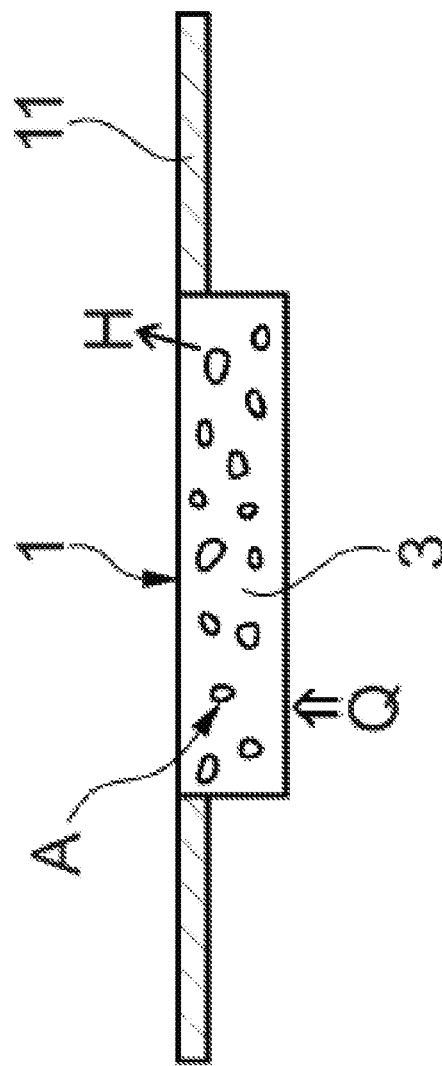
Figure 6B:
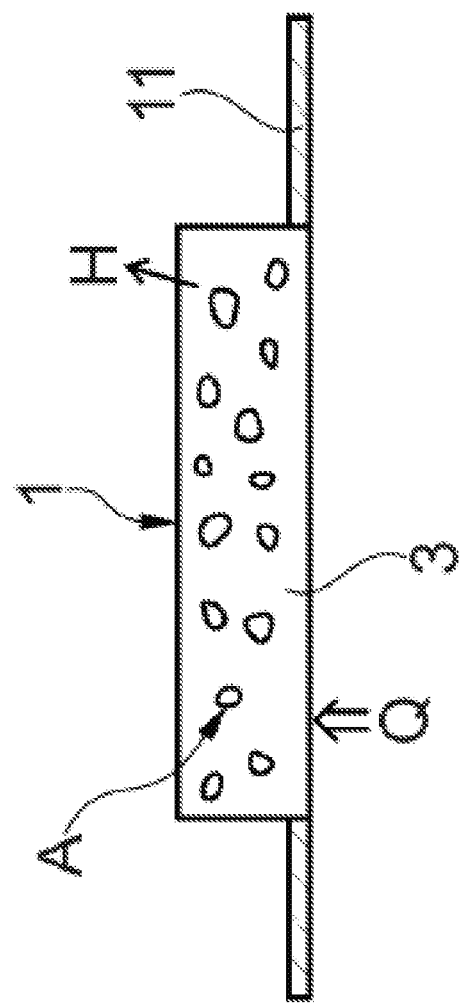

In FIGS. 6A, 6B, 6C, and 6D an embodiment is shown in which the heat transfer device 1 is embedded into the casing 11. In FIGS. 6A and 6B the heat transfer device 1 is flush with the outer side of the casing 11 (FIG. 6A) or flush with the inner side of the casing 11 (FIG. 6B). In both cases the cool airflow A is directed into the porous medium 3 within the heat transfer device 1, as in the embodiment shown in FIG. 5A. The embodiments shown in FIGS. 6C and 6D show heat exchange devices 1 with additional oil channels 4 (as in FIG. 5B), FIG. 6C showing an embodiment which is flush with the outer side of the casing 11, FIG. 6D showing an embodiment which is flush with the inner side of the casing 11.

FIGS. 7A, 7B depict another variant of the embodiments shown in FIGS. 5 and 6. Here, the heat transfer device 1 is attached to the casing 11, i.e., it is outside the casing 11, comprising a porous medium 3. In FIG. 7A the cool airflow A enters the porous medium 3, while the hot oil O is contacting the outside of the heat transfer device 1. In the embodiment shown in FIG. 7B the compartment with the porous medium 3 is interspersed with oil channels 4 through with oil O from the power gear box 10 can flow. The oil channels 4 enlarge the heat transfer area of the heat transfer device 1 and allow a better convective heat transfer.

Figure 8:
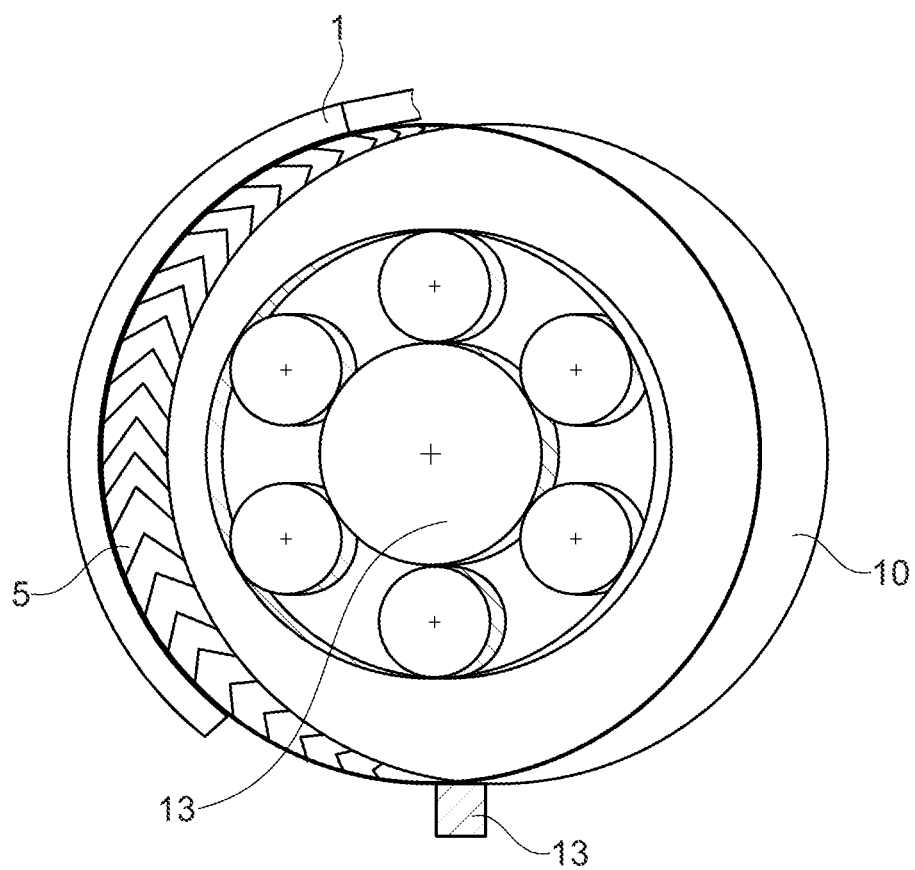
FIG. 8 shows a perspective view of a casing of a power gear box.
Figure 9:
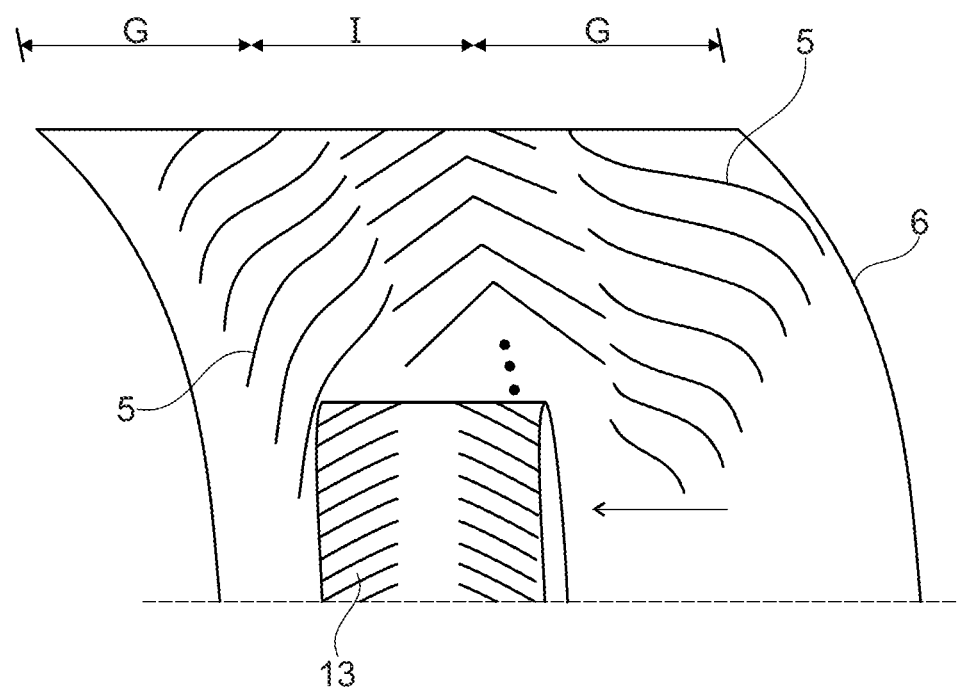
FIG. 9 shows a detail of the inner surface of the casing shown in FIG. 8 with an embodiment of a heat transfer structure and/or fluid flow guiding structure.
Figure 10:
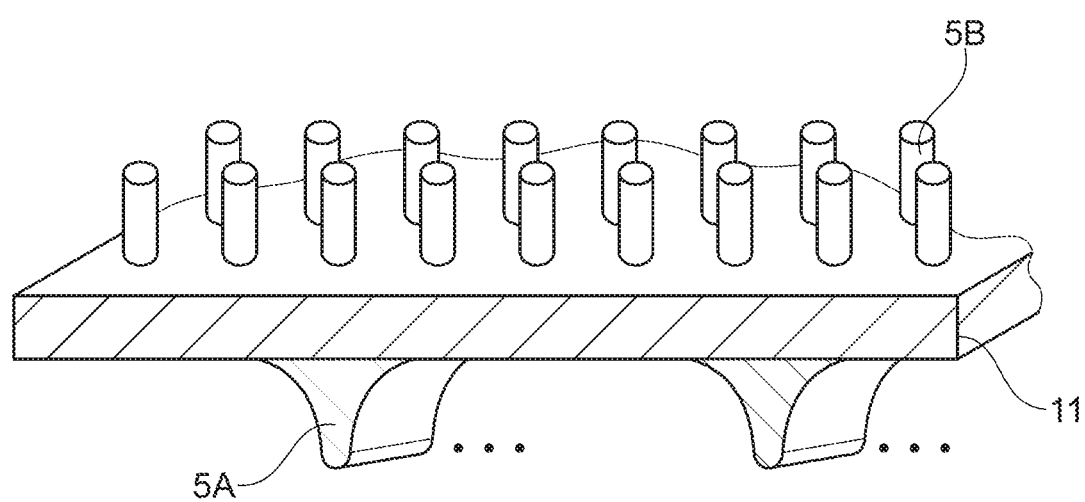
FIG. 10 shows details of a casing or heat exchange device with heat transfer structure and/or fluid flow guiding structure.

In FIGS. 8, 9 and 10 different views of heat exchange systems are shown in which the heat exchange device 1 and/or the casing 11 comprises a heat transfer and fluid guiding structure 5 on its surface. The casing 11 is, here, the load bearing structural element. The fluid guiding structures 5 can also be considered as oil collectors in this case, as will be described. Guiding away the hot oil from the power gear box 10 is beneficial to the load independent losses (windage).

It is the purpose of the combined heat transfer structure and fluid guiding structure 5 to enhance the heat transfer by enlarging the heat transfer surface. This can e.g. be achieved by providing a ribbed surface structure, a studded surface structure and/or a finned surface structure. The heat transfer structures 5 can be positioned on the inside of the casing 11 (as seen from the power gear box 10), on the outside of the casing 11 or on both sides. In addition or alternatively, the heat exchange and fluid guiding structures 5 can be positioned on the heat exchange device 1.

In FIG. 8, the power gear box 10 comprises a planetary gear drive 13. The power gear box 10 has an essentially circular cross-section and is positioned within a casing 11 with also a circular cross section in this sectional plane. The casing 11 is coupled with a heat exchanger device 1, as e.g. shown in FIG. 2, 2A, 2B, 2C, 3, or 4. This means that at least one heat exchange device 1 is enclosed, embedded and/or attached with the casing 11, but this is just shown symbolically in FIG. 5 for reasons of simplicity. The heat exchange device 1 extends around a section of the circumference. In other alternatives, the heat exchange device 1 extends around the complete circumference.

At the bottom of the casing 11 a valve 13 (i.e. a scavenge port) is positioned to control the oil flow towards a pump (not shown here). This valve 13 can, e.g., be positioned in the apex of a V-shaped heat exchange device 1 as shown e.g. in FIG. 2.

The heat transfer is enhanced by providing a heat transfer and fluid guiding structure 5, which here takes the shape of a ribbed surface. In the shown embodiment the heat transfer and fluid guiding structure 5 extends around the circumference of the inner side of the casing 11. In other embodiments the heat transfer and/or fluid guiding structure 5 only partially covers the inner side of the casing 11.

The ribbed surface of the heat transfer and fluid guiding structure 5 in FIG. 8 has a chevron like structure which is symmetric to the middle plane of the power gear box 10. As is shown in connection with FIG. 9, this ribbed surface is suited for guiding oil spilling from the power gear box 10 during operation away from an impingement area I while at the same time enhancing the heat transfer by providing an enlarged heat transfer area.

FIG. 9 shows a perspective view from the inside of the casing 11, with the gear drive 13 visible in the front. As mentioned above, the planetary gear drive 13 is surrounded by the casing 11 of which the inner surface is shown in FIG. 9.

The central part of the inner surface of the casing 11 is the impingement area I where oil drops mainly hit the casing 11 due to the centrifugal forces within the power gear box 10. In this impingement area I the ribbed surface has the chevron like structure as shown in FIG. 9. This impingement area I has about the same width as the gear drive 13.

To both sides of the impingement area I respective guiding areas G comprise channels or grooves 6 which further guide away the oil which has impinged on the inner surface of the casing 11.

The heat transfer and fluid guiding structure 5 with its double purpose of enhancing the heat transfer and guiding the oil flow can, e.g., be manufactured by a generative process, such as laser cladding with a material with a higher thermal conductivity than the material of the casing 11.

In alternative embodiments the shape of the heat transfer and fluid guiding structure 5, in particular the ribbed structure, can differ from the chevron structure shown in FIG. 8 or 9. The ribs can e.g. be linear across the complete inner surface of the casing 11.

It is also possible to include solely fluid guiding structure 5 with the casing 11 and/or the power gear box 10.

It is also possible to use, e.g., a studded surface as shown in FIG. 10 as heat exchange structure.

On the embodiment shown in FIG. 10, the inner side of the casing 11 comprises the heat exchange and fluid flow guiding structures 5A in the form of ribs (e.g. as shown in FIG. 8 or 9). The outer side of the casing 11 comprises a studded surface 5B.

In other embodiments, the ribbed surface 5A and the studded surface 5B could be combined, e.g., on the inner side of the casing 11 and on the heat exchange device 1.

The heat transfer device 1 as described above can be manufactured by a deposition laser process, such as e.g. laser cladding. Using this process, e.g. a porous medium 3 could be generated by a regular porous pattern or an amorphous porous pattern. A laser deposition process can, e.g., be used to generate ribs on a surface of the heat transfer device 1 to enlarge the heat transfer area. The laser deposition process allows for a high degree of freedom in designing the heat transfer device 1. With this process different parts of the heat transfer device 1 could also be made from different materials, e.g., material with different thermal conductivities.

The heat exchange management system is described above in connection with an aircraft engine 100. The heat exchange system is not limited to aircraft turbo engine 100. It can also be used in other stationary turbo machines.

All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

LIST OF REFERENCE NUMBERS 1 heat transfer device
3 porous medium
4 oil channels
5 heat transfer and/or fluid flow guiding structure
5A ribbed surface (heat transfer and fluid flow guiding structure)
5B studded surface (heat transfer structure)
6 channel/groove for guiding oil
10 power gear box
11 casing of power gear box
12 oil collector
13 gear drive
100 aircraft turbo engine
105 scoop
110 rotational axis of turbo engine
120 air intake
130 fan
131 cone of fan
140 gear train
150 low pressure compressor
160 high pressure compressor
170 combustor
180 high pressure turbine
190 low pressure turbine
200 exhaust nozzle
210 nacelle
220 bypass duct
230 core of an aircraft engine
250 vane
A cold airflow
A1 first cold airflow
A2 second cold airflow
C compressor airflow (hot)
G guiding area
H1 first hot airflow, in particular for deicing
H2 second hot airflow
H3 third hot airflow
H4 fourth hot airflow
I Impingement area
O oil flow
Q heat flow
V valve system

The invention claimed is:

1. A heat exchange system for a power gear box mechanically coupling at least one low pressure compressor stage with at least one turbine stage in a turbo engine, comprising:
a casing of the power gear box,
at least one heat transfer device which is at least one chosen from enclosed within and embedded in the casing of the power gear box,
wherein at least one chosen from the casing and the at least one heat transfer device comprises at least one chosen from a heat transfer structure and a fluid flow guiding structure, the at least one chosen from the heat transfer structure and the fluid flow guiding structure including at least one chosen from a ribbed surface, a finned surface and a studded surface,
wherein at least one airflow is directed to the at least one heat transfer device for thermally controlling the power gear box.

2. The heat exchange system according to claim 1, wherein the at least one heat transfer device thermally links the power gear box containing oil with an exterior of the power gear box.

3. The heat exchange system according to claim 1, wherein the at least one airflow is taken from a region downstream from at least one chosen from a fan of the turbo engine and a cone of the fan to cool the power gear box.

4. The heat exchange system according to claim 1, wherein the at least one heat transfer device includes a cold side connected to at least one airflow downstream from a fan of the turbo engine and upstream of an annulus of a core of the turbo engine.

5. The heat exchange system according to claim 1, wherein the at least one heat transfer device is located in an axial direction of the turbo engine partially or completely between a tip of a fan cone of the turbo engine and the power gear box.

6. The heat exchange system according to claim 1, wherein the at least one heat transfer device is positioned at least partially on a circumference of at least one chosen from the power gear box and the casing.

7. The heat exchange system according to claim 1, wherein an airflow is heated by the at least one heat transfer device to be used for anti-icing.

8. The heat exchange system according to claim 1, wherein the at least one heat transfer device comprises at least partially a porous medium comprising, at least partially, oil channels for enhancing heat transfer.

9. The heat exchange system according to claim 8, wherein the porous medium is in thermal contact with the power gear box and comprises at least one chosen from a metal foam and a 3D printed mesh.

10. The heat exchange system according to claim 1, wherein at least one chosen from the casing and the at least one heat transfer device comprises an impingement area for oil drops originating from operation of the power gear box, the impingement area comprising at least one chosen from a portion of the heat transfer structure and a portion of the fluid flow guiding structure.

11. The heat exchange system according to claim 10, wherein the at least one chosen from the at least one heat transfer structure and the fluid flow guiding structure comprises or forms a guide element for guiding impinged oil towards a predetermined location of the casing with a rib structure to guide impinged oil from a center plane to end planes of the casing.

12. The heat exchange system according to claim 1, wherein the at least one heat transfer device comprises a material with a higher thermal conductivity than the casing of the power gear box.

13. The heat exchange system according to claim 1, wherein at least one chosen from the at least one heat transfer device, the at least one heat transfer structure and the fluid guiding structure is manufactured by a generative process, including a laser cladding process.

14. A power gear box of a turbo engine coupled with at least one heat exchange system according to claim 1.

15. A turbo engine with at least one power gear box according to claim 14.

16. An aircraft turbo engine with at least one power gear box according to claim 14.

17. The heat exchange system according to claim 1, wherein the at least one heat transfer device is connected to an airflow taken from compressor bleed air to heat up the power gear box.

18. The heat exchange system according to claim 1, and further comprising at least one valve system controlling at least one chosen from at least one input airflow, at least one input compressor airflow and at least one exit airflow from the at least one heat transfer device.

19. A heat exchange system for a power gear box mechanically coupling at least one low pressure compressor stage with at least one turbine stage in a turbo engine, comprising:
- a casing of the power gear box,
- at least one heat transfer device which is at least one chosen from enclosed within, embedded in and attached to the casing of the power gear box,
- wherein at least one chosen from the casing and the at least one heat transfer device comprises at least one chosen from a heat transfer structure and a fluid flow guiding structure, the at least one chosen from the heat transfer structure and the fluid flow guiding structure including at least one chosen from a ribbed surface, a finned surface and a studded surface,
- wherein at least one airflow is directed to the at least one heat transfer device for thermally controlling the power gear box;
- wherein the at least one heat transfer device comprises a porous medium comprising at least partially, oil channels for enhancing heat transfer.

20. A heat exchange system for a power gear box mechanically coupling at least one low pressure compressor stage with at least one turbine stage in a turbo engine, comprising:
- a casing of the power gear box,
- at least one heat transfer device which is at least one chosen from enclosed within, embedded in and attached to the casing of the power gear box,
- wherein at least one chosen from the casing and the at least one heat transfer device comprises at least one chosen from a heat transfer structure and a fluid flow guiding structure, the at least one chosen from the heat transfer structure and the fluid flow guiding structure including at least one chosen from a ribbed surface, a finned surface and a studded surface,
- wherein at least one airflow is directed to the at least one heat transfer device for thermally controlling the power gear box;
- wherein at least one chosen from the casing and the at least one heat transfer device comprises an impingement area for oil drops originating from operation of the power gear box, the impingement area comprising at least one chosen from a portion of the heat transfer structure and a portion of the fluid flow guiding structure.

* * * * *